W. T. & H. E. VAN DORN.
RAILWAY DRAW HEAD AND COUPLING.
APPLICATION FILED JULY 24, 1911.
1,148,556.
Patented Aug. 3, 1915.
7 SHEETS—SHEET 1.
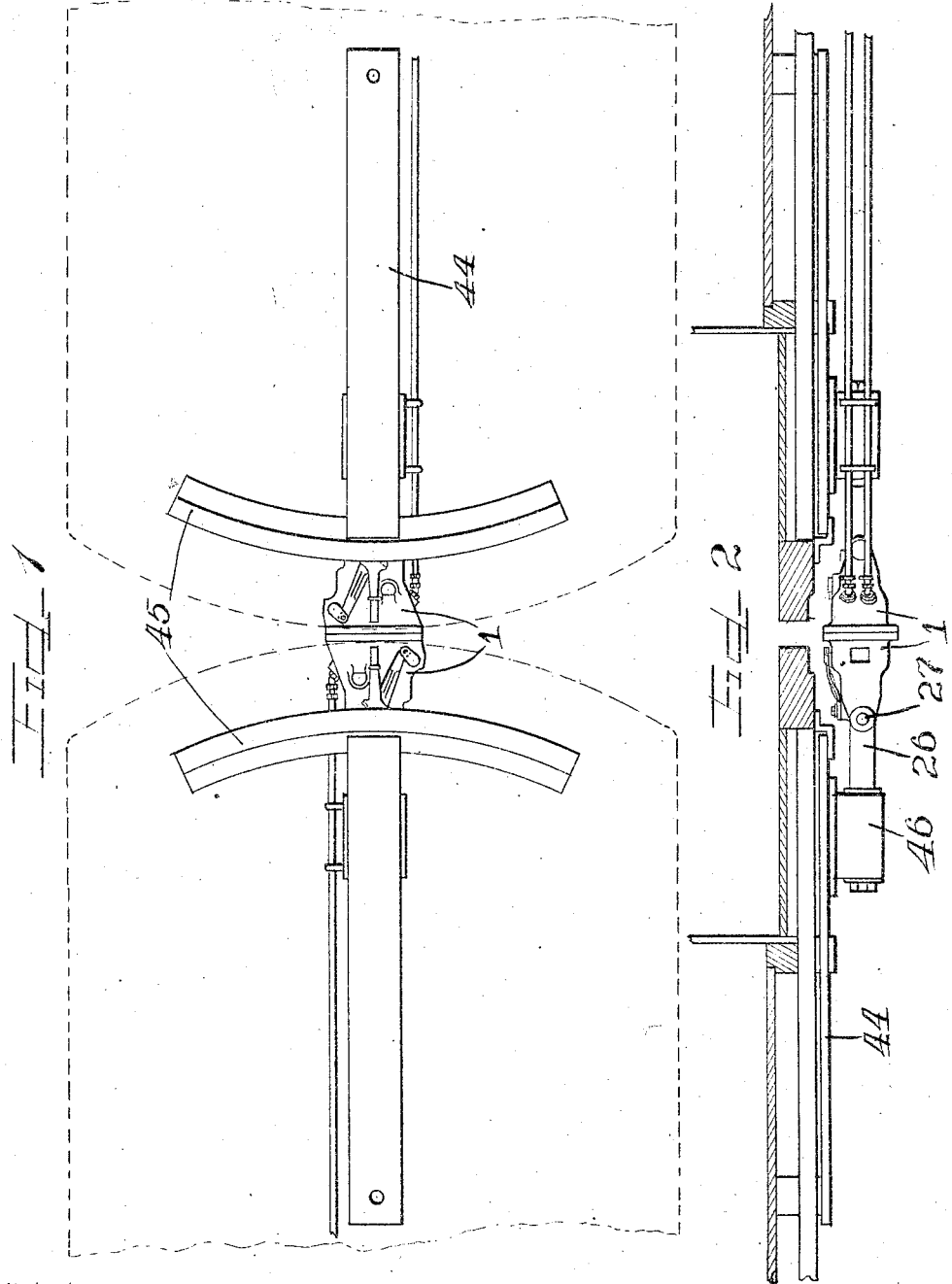

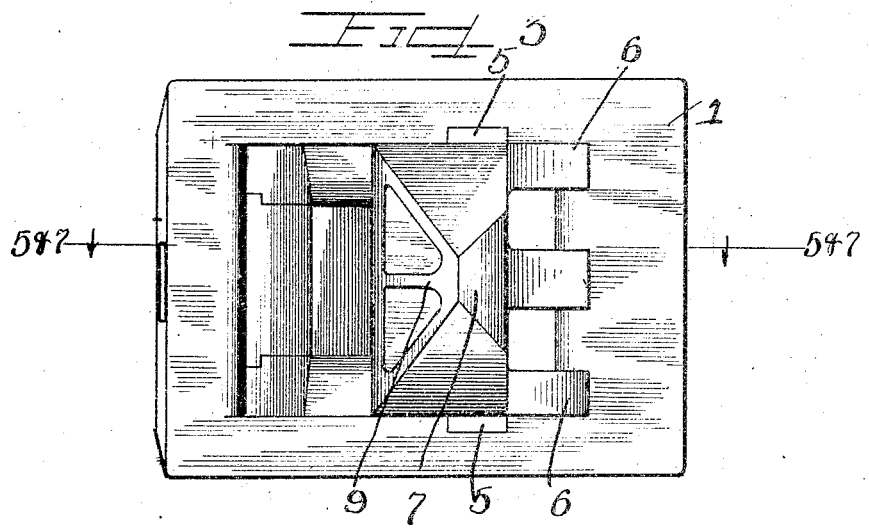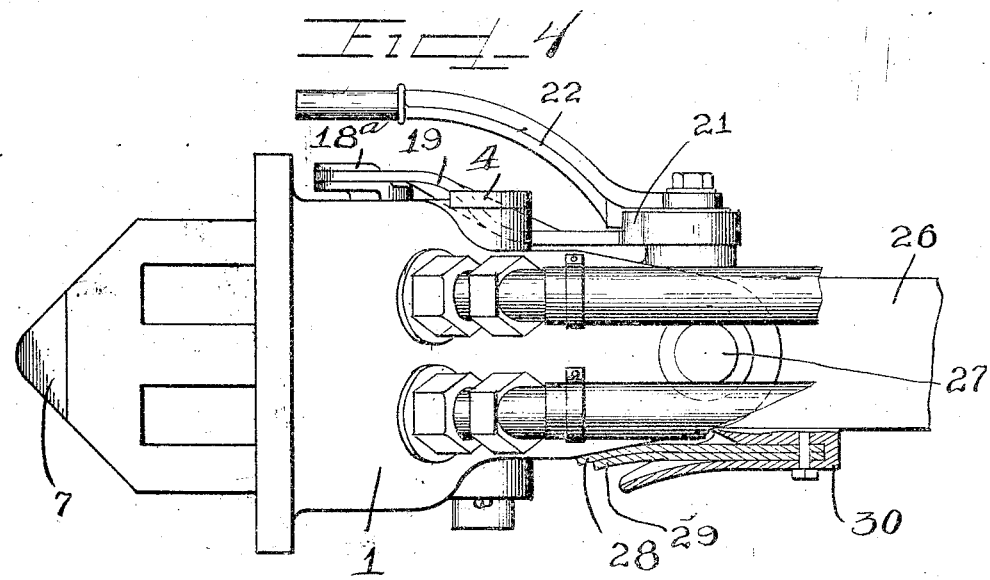

W. T. & H. E. VAN DORN.
RAILWAY DRAW HEAD AND COUPLING.
APPLICATION FILED JULY 24, 1911.
1,148,556.
Patented Aug. 3, 1915.
7 SHEETS—SHEET 3.
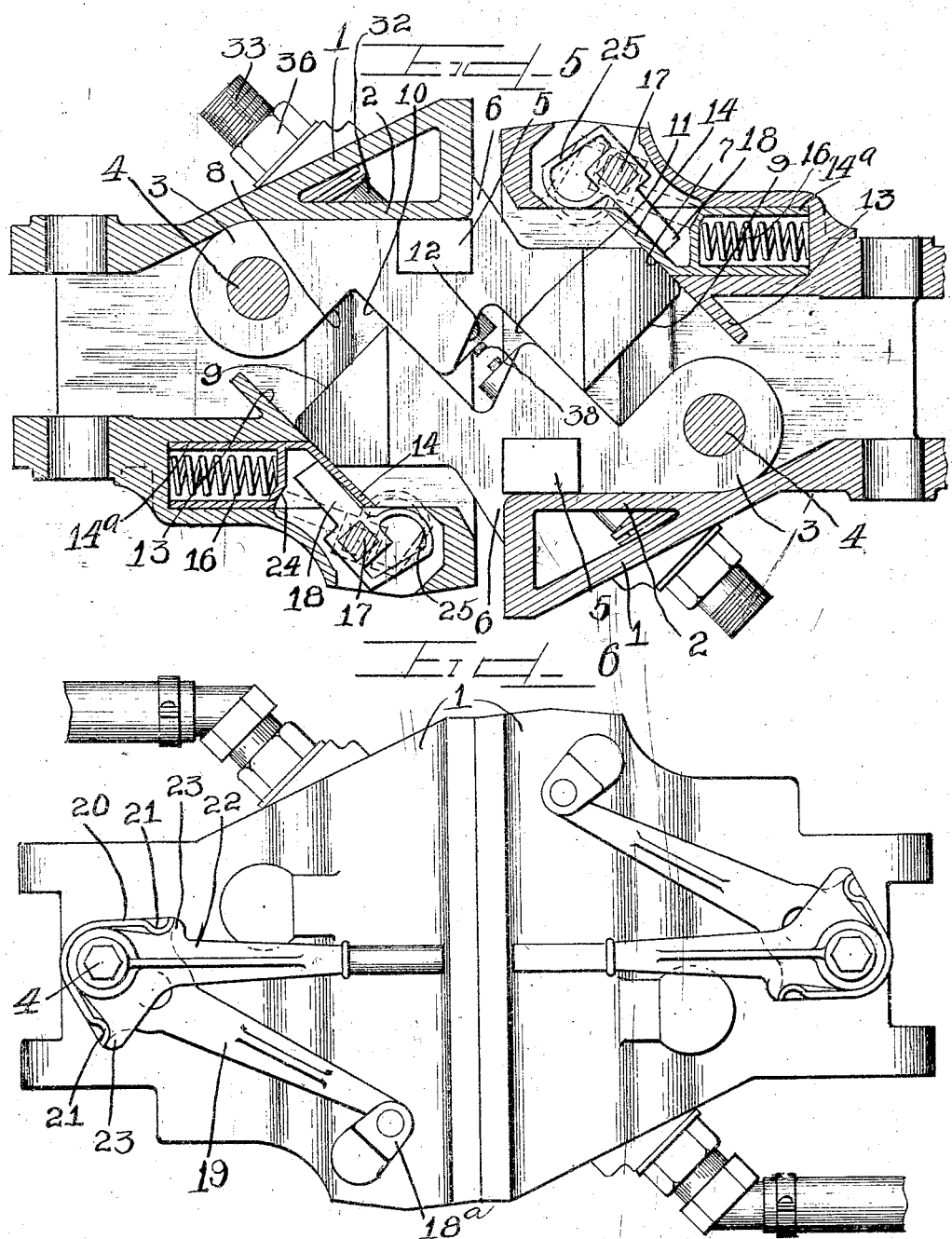

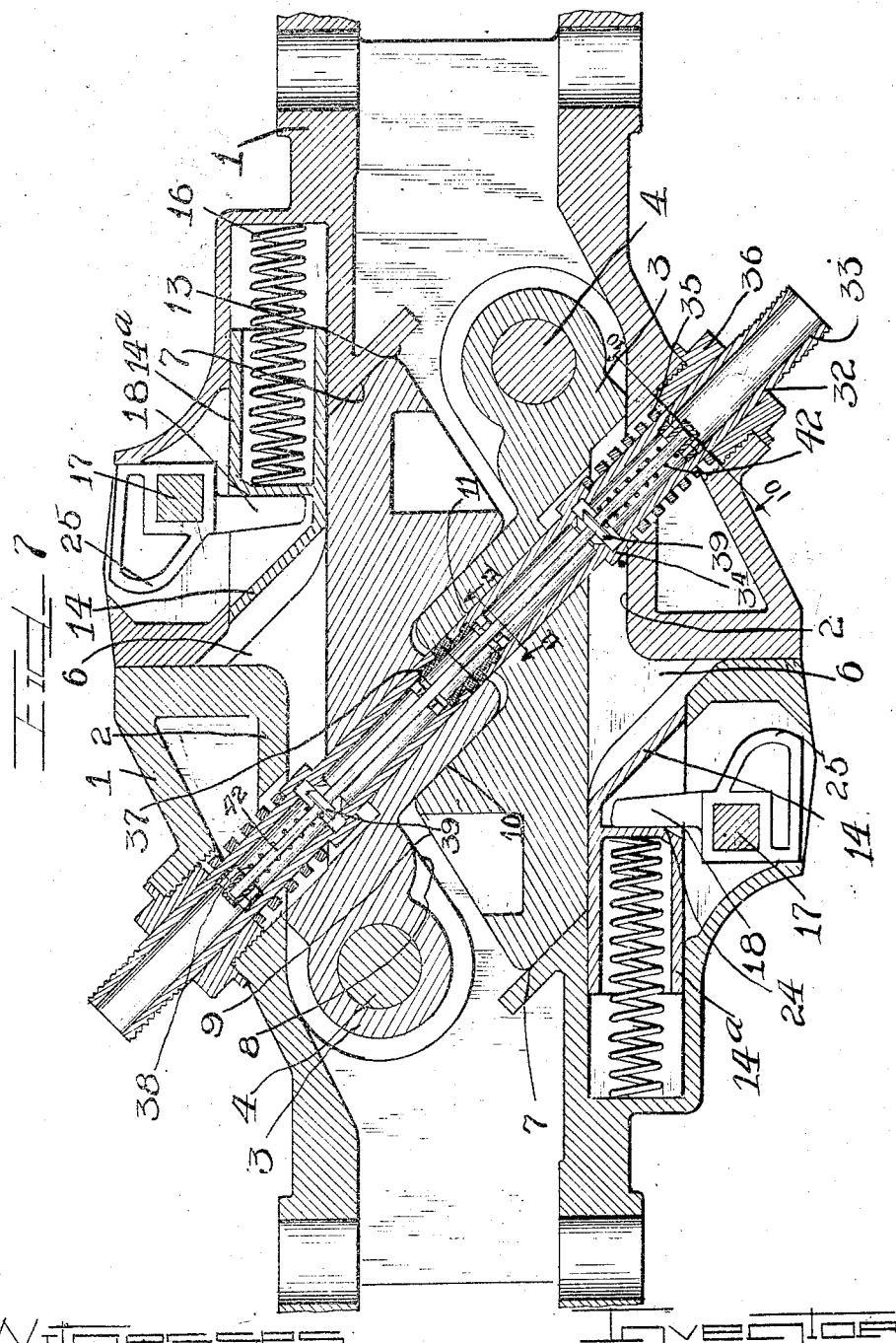

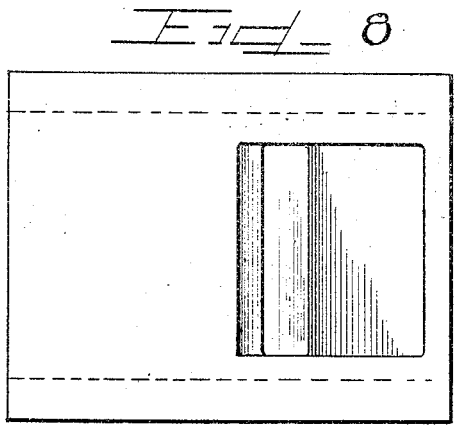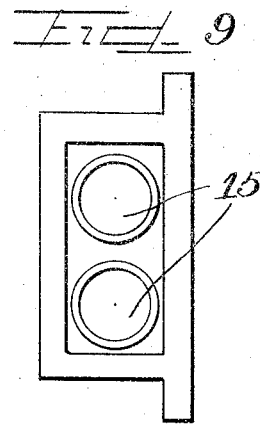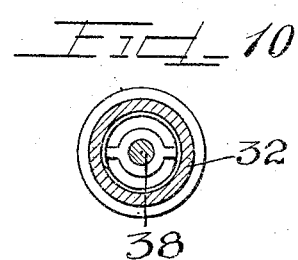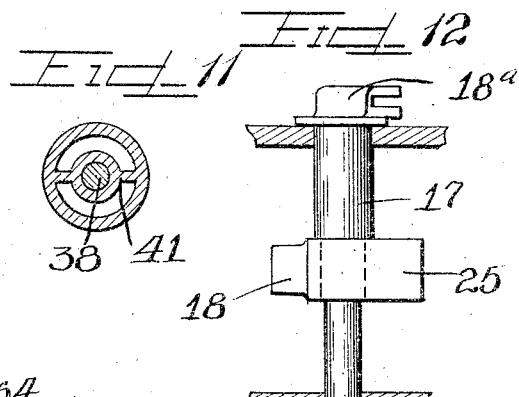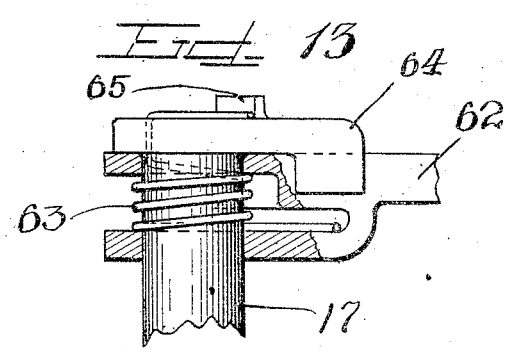

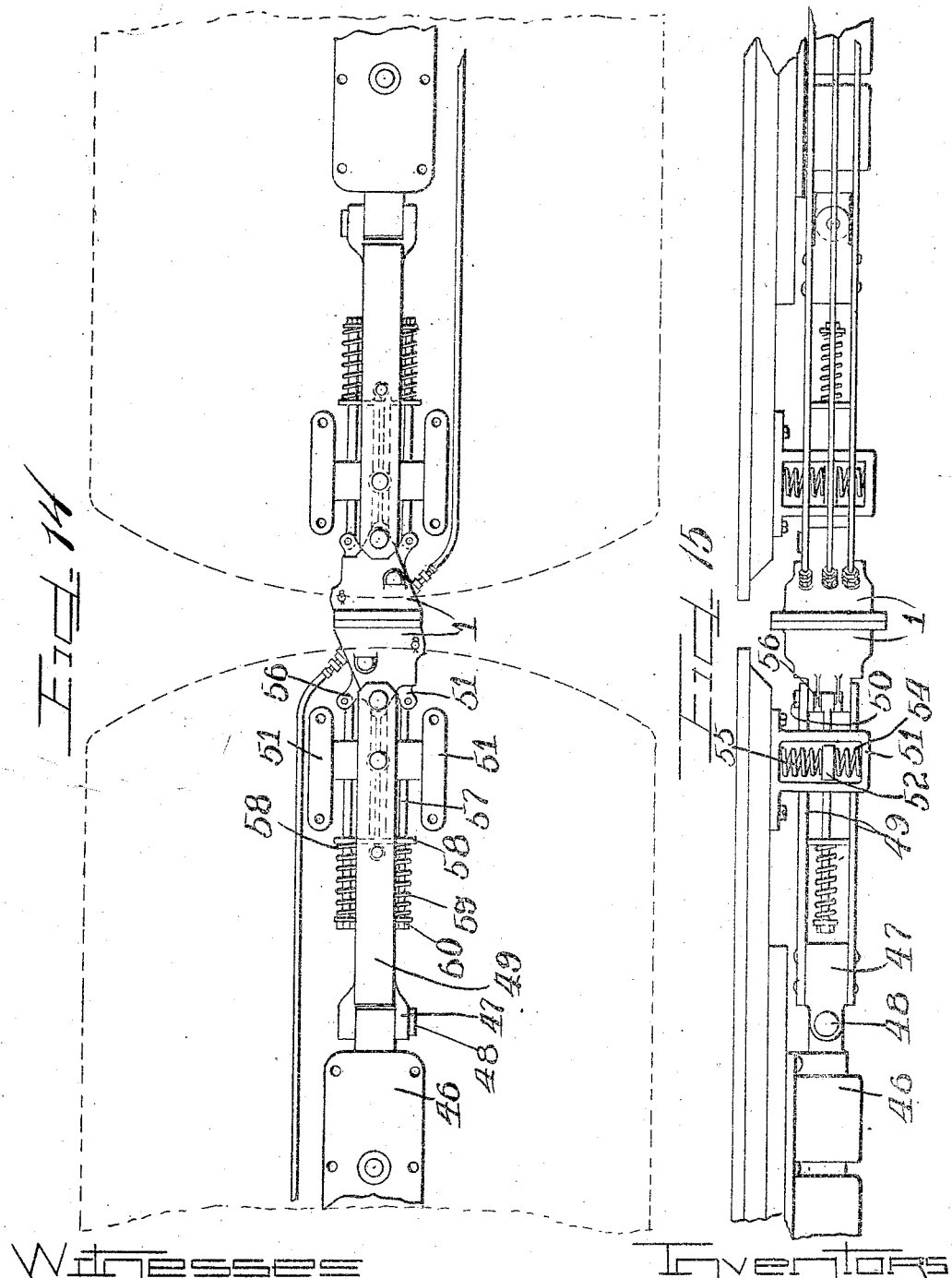

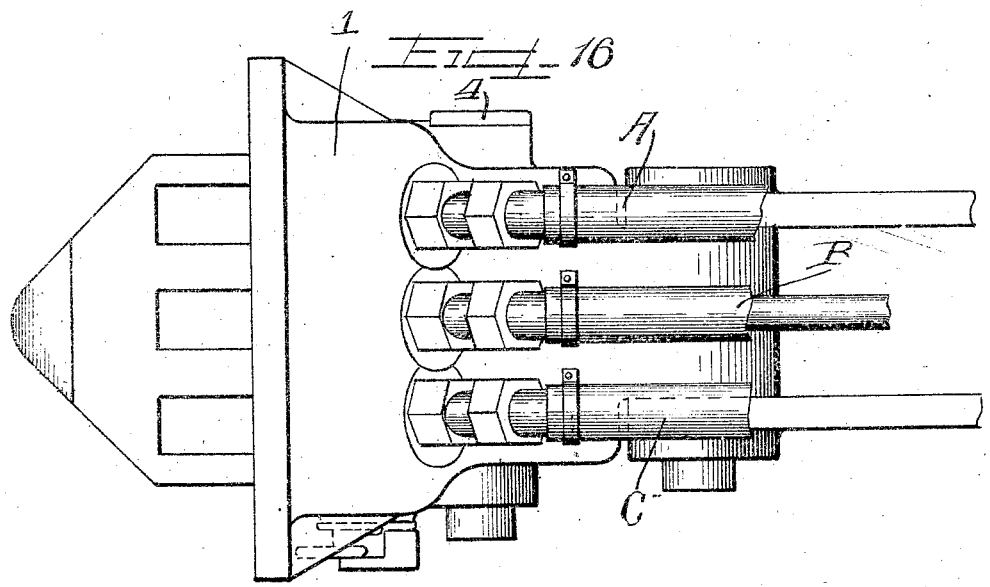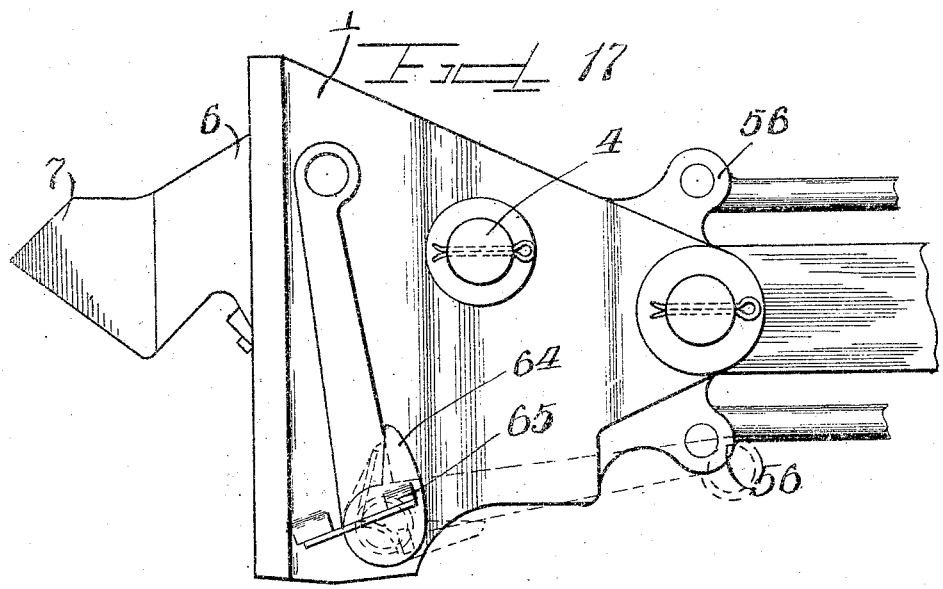

UNITED STATES PATENT OFFICE.

WILLIAM T. VAN DORN AND HERBERT E. VAN DORN, OF CHICAGO, ILLINOIS.

RAILWAY DRAW-HEAD AND COUPLING.

1,148,556.　　　　Specification of Letters Patent.　　Patented Aug. 3, 1915.

Application filed July 24, 1911. Serial No. 640,235.

*To all whom it may concern:*

Be it known that we, WILLIAM T. VAN DORN and HERBERT E. VAN DORN, citizens of the United States, and residents of the city of Chicago, in the county of Cook and State of Illinois, have invented certain new and useful Improvements in Railway Draw-Heads and Couplers; and we do hereby declare that the following is a full, clear, and exact description of the same, reference being had to the accompanying drawings, and to the numbers of reference marked thereon, which form a part of this specification.

Heretofore couplers of the M. C. B. or "Janney" type have been made standard for steam roads and have gone into general use. The construction of these couplers, however, is such that, apparently unavoidably, a large amount of slack is left between the drawheads permitting an independent longitudinal movement of one drawhead relatively to the other, and permitting also in some instances, the buckling of the drawheads one upon the other at their point of engagement. Both of these movements occasion breakage of the knuckle and consequent breaking in two of the train, frequently occasioning disastrous wrecks and much loss.

It has been impossible heretofore to afford any suitable connection with an M. C. B. coupler whereby the steam and air lines of the trains could be coupled simultaneously with the coupling of the drawheads. Although various attempts have been made along this line, the resulting structures were so clumsy and unreliable as to render them practically valueless and usually the construction is such as to render the coupling of the air and steam lines of the train entirely insufficient to prevent leakage on curves. While these are the conditions on steam roads, substantially similar conditions have existed on interurban, elevated and subway roads and particularly so, inasmuch as the curves are frequently of short radius, practically precluding the successful use of the Janney type of coupler.

The object of this invention is to afford a drawhead and coupler so constructed as to afford an absolutely rigid connection between the drawheads, rendering movement of either drawhead impossible relatively the other either longitudinally or laterally thereof—in other words, to so connect the drawheads as to form substantially a rigid bar from end to end, and to so connect the drawheads on the under frame of the car or a suitable draft rigging, as to permit satisfactory adaptation on curves by the swinging of the draft gears as a whole.

It is also an object of the invention to afford a construction whereby one or more lines of air or steam hose are so connected with the drawheads as to enable the air and steam lines to be coupled simultaneously with the drawheads, insuring a tight joint for each, and without requiring appreciably greater space than when the steam and air lines are not used.

It is also an object of the invention to afford a construction in which a plurality of steam and air lines may be connected in the interlocking mechanism or mutually engaging mechanism of drawheads when coupled in such positions as to insure the exact registering and coupling of the hose simultaneously with the coupling of the drawhead and without possibility of injuring the hose connections.

The invention consists in the matters hereinafter described and more fully pointed out and defined in the appended claims.

In the drawings: Figure 1 is a top plan view of two coupled draft gears provided with drawheads embodying our invention, and showing the cars (for example, interurban or elevated cars) in dotted lines. Fig. 2 is a side elevation of the same, showing the car platforms in longitudinal section. Fig. 3 is an enlarged front end elevation of one of the drawheads. Fig. 4 is a side elevation thereof. Fig. 5 is a section on line 5—5 of Fig. 3. Fig. 6 is a top plan view of two drawheads, showing the same coupled. Fig. 7 is an enlarged horizontal section on line 7—7 of Fig. 3. Fig. 8 is an enlarged view in elevation of the lock for one of the coupling links. Fig. 9 is a bottom plan view thereof. Fig. 10 is a section on line 10—10 of Fig. 7. Fig. 11 is a section on line 11—11 of Fig. 7. Fig. 12 is an enlarged side elevation of the shaft and bolt for retracting or actuating the locking bolt. Fig. 13 is an enlarged sectional detail of the releasing lever. Figs. 14 and 15 are top plan views and side elevations respectively of an installation of our invention for steam roads. Fig. 16 is an enlarged view in side elevation of one of the drawheads and connections illustrated in Figs. 14 and 15. Fig. 17 is a top plan view thereof.

As shown in the drawings: The drawheads 1, are faced flat on their meeting faces to afford a tight joint, as shown in Figs. 5 and 7, and each is cored to afford upper and lower flat walls, and a flat wall 2, in the corresponding side of each. Rigidly secured in said drawhead is a coupling link 3. This, as shown, is engaged in place by means of a pin 4, which extends through the drawhead and inner end of said link and is provided on one end with a head and on the other preferably with a cotter pin to engage the same in place. Each of said links is provided on the upper and the lower side thereof with a lug or relatively broad rib 5, which seats in an aperture or recess therefor in the bottom and top walls of said drawhead and acts to hold said link from any movement whatsoever relatively the drawhead in which it is secured. Each of said links is provided on its outer side with an outwardly directed shoulder 6, which bears against a part of the flat front face of the drawhead and from the extremity thereof, said link inclines inwardly and forwardly beyond the line of its outer face within the drawhead and thence extends longitudinally to near its extremity, and the point thereof is beveled inwardly, as indicated at 7, in Figs. 3, 5, and 7. On its inner face, each of said links affords a succession of inclined steps or engaging faces, all of which are arranged substantially obliquely the axis of the drawhead.

As shown, an inner and an outer inclined face 8, and 9, are provided thereon, said inclined faces being complemental, so that the link in one drawhead, may coincide and interfit with, and lie substantially parallel with the corresponding face of the other when the drawbars are in coupled relation. Said inclined face 9, affords nearly a right angle with the outer inclined face 7, together therewith affording the point of the link and each of said links is beveled upwardly and downwardly from its lower and upper faces respectively to bring said link to substantially a sharp point to facilitate the entry of the end of each link into the drawhead with the complemental link.

Parallel inwardly and rearwardly inclined faces 10 and 11, are provided on each link, between and connecting which is an inclined face 12, arranged slightly obliquely with the outer engaging faces of the drawhead, as shown in Figs. 5 and 7. Within each drawhead is an inwardly inclined wall 13, the angle of inclination thereof being substantially the same as the angle of inclination of the face 7, on the link.

Seated in each drawhead is a locking bolt 14[a] having an inner inclined face 14, corresponding with the inclined face or wall 13, within the drawhead and adapted when the locking bolt is pressed inwardly, to lie in the same plane therewith. Said bolt is provided with recesses 15, in the inner end thereof, in which are engaged pushing springs 16, which act normally to hold said locking bolt forwardly to the position shown in Fig. 7.

Extending vertically through the side wall of the drawhead at the outer side of said locking bolt 14, is a shaft 17, having an arm or lever 18, secured thereon, which extends into the recess 15, at the outer side of the locking bolt to permit the same to actuate said bolt. Said shaft 17, is provided on its upper end with a laterally directed crank arm 18[a], and pivotally engaged thereon is a lever 19, which is longitudinally slotted to receive the head or upper end of the pin 4, therethrough, whereby the link in the same drawhead is engaged in place. A flange 20, integral with the rear end of said lever, is provided around the end thereof and on each side of the same at a point in advance of said pin and at its extremities are rounded to afford a cam surface 21, at each side of said lever. Pivotally engaged on the pin 4, as shown in Fig. 6, is a releasing lever 22, provided with a handle for manual engagement, and, as shown, having laterally directed arms 23, one on each side thereof to engage the cam faces 21, on the flange 20, so that movement of the actuating lever 22, in either direction, serves to retract the lever 19, and thereby rotate the shaft 17, and retract the locking bolt against the tension of the springs to the position shown in Fig. 5. As shown, a shoulder 24, is provided on said locking bolt in said recess, against which the end of the lever 18, engages to hold said bolt retracted when uncoupled, or preparatory to coupling, if desired. A rounded cam 25, is provided on said shaft 17, which may be integral with the lever or arm 18, if desired, and which projects inwardly into position to be engaged and actuated by the link when the bolt is held retracted by the arm 18, thereby permitting said bolt to slide forwardly when the links are in coupled engagement, as shown in Fig. 7.

As shown in Figs. 4 to 7 inclusive, said drawheads are pivotally engaged upon the draft iron 26, by means of a transverse bolt 27, which extends through the tail of the drawhead and through the draft iron or bar, which is inserted, as shown in Fig. 2, thereinto, and a spring comprising one or more leaves 28 and 29, as shown in Fig. 4, is engaged on the draft iron 26, and extends beneath and supports the drawhead in operative position for coupling.

As shown, a clip or casing 30, is bolted on the draw bar and receives the rear end of said leaf spring, and is provided with a downwardly curved under wall adapted to limit the flexing of said springs when stressed by the weight of the drawhead or otherwise.

Inasmuch as the link in each drawhead is rigidly held from movement in its drawhead, no difficulty is experienced in connecting the air and steam couplings through the drawheads and links to automatically couple the air and steam lines simultaneously with the coupling of the drawheads. For this purpose, each drawhead and the link therein, is bored obliquely, as shown in Figs. 5 and 7, to afford the desired number of connections for the steam and air lines.

Slidably fitted in the bore in each drawhead and link, is a pipe 32, which is threaded at its outer end 33, for connection in any suitable manner with the proper leads of hose or pipe, as shown in Figs. 4 and 6. The bore through the side of the drawhead and into the link, is somewhat larger than the bore through the link, and said pipe 32, is provided with an integral collar 34, thereon, which affords an inwardly directed shoulder to limit the inward adjustment of said pipe through the link, as shown in Fig. 7, and an outwardly facing shoulder to engage the inner end of a spring 35, which is secured on said pipe, and at its outer end bears against a stop afforded by a nut 36, threaded into the wall of the drawhead and through which said pipe 32, slides. Each of said pipes 32, at the inner end, is provided with a rubber or other suitable packing 37, engaged on the ends thereof, and extending thereinto and acting when the drawheads are brought into coupled relation, as shown in Fig. 7, to register and to afford an air and steam tight connection between the ends of said pipes or tubes 32. The bore of the pipe is increased within the integral collar 34, to afford a valve chamber and slidably engaged at the axis of each of said pipes 32, is a valve rod 38, having a puppet valve closure 39, thereon. The valve rod 38, is held axially in each pipe and extends through suitable apertures provided in guide webs 41, which extend diametrically across each of said pipes near each end thereof, and, as shown, a pushing spring 42, is provided on each of the valve rods and bears against the outer guide web for the valve rod at one end, and at the other against the valve closure. Said valve rods are of sufficient length, as shown in Fig. 5, to extend beyond the packing on each of said pipes and the disposition of the valve rods is such that when the drawheads are coupled, as shown in Fig. 7, the valves in the air and steam lines are of necessity opened automatically, while the uncoupling (or breaking in two at the drawheads, if such a thing were possible) would result in the instant closing of said pipes by releasing the valves.

In the construction illustrated in Figs. 1 to 7 inclusive, the construction is shown as embodied for interurban or elevated and subway use, and for use on the larger street railway cars. When so used, conveniently the drawhead is carried upon any suitable radius bar 44, swingingly secured to the under frame of the car and supported upon a segment shaped carrying iron 45, to permit said draft gears to swing as required beneath the cars in passing around curves or otherwise without necessitating any lateral bending between the points of pivotal connection on the respective cars. A draft and buffing gear 46, of any kind may afford the connection between the draft iron and radius bar or the draft and buffing gear may be provided at the inner end of the radius bar or any suitable construction for this purpose may, of course, be used.

The construction illustrated in Figs. 14 to 17 inclusive illustrate an embodiment of our invention for steam roads and for certain interurban roads. For this purpose, as shown, a draft gear 46, of any suitable kind is secured on the under frame of the car and the draft iron or irons 47, are pivotally engaged thereon by means of a pin 48, extending therethrough horizontally, as shown more clearly in Figs. 14 and 15. Said draft iron comprises, as shown, forwardly directed parallel arms 49, rigidly secured on the draft iron 47, and are pivotally secured to the tail of the drawhead by means of a pin 50, which extends through said arms 49, and the tail of the drawhead, as shown in Fig. 15. A bracket 51, is provided on each side of said draft arms 49, and secured on the draft arm and extending through said brackets is a bar 52, which rests at its ends on springs 54, secured in each of said brackets and upon which bears at each end thereof a spring 55, also engaged in said bracket, thus permitting the coupler or drawhead to move upwardly or downwardly as desirable, when the car is in motion and also permitting said draft heads to adapt themselves into alinement when coupled, even should the height of the car platforms vary somewhat. A laterally directed lug 56, is provided on each side of the drawhead near its tail, and pivotally engaged with each is a rod 57, which extends inwardly through the lugs 58, secured on each side of the draw bar. A spring 59, is secured on each of said rods and at all times is held under compression by means of suitable nuts 60, secured on the ends of said rods 59. In this construction, three train pipes or lines A, B and C, are shown connected through the drawhead. In this construction also, the lever 62, for retracting the locking bolt, is provided on the under side of the drawhead instead of on the top thereof, and is secured on the lower end of the pin 17. As shown, said lever 62, is longitudinally slotted at its end engaging said pin to receive a coiled spring 63, which is wound on said pin therein. One end of said spring engages said lever in the slot, as shown in Fig. 13, and the other thereof extends upwardly around the end of said lever through a suitable aperture in the lever 64, secured on said pin 17, and bears against a suitable shoulder 65, on the top of said lever and also at its extremity against a shoulder or stop 66, integral with the drawhead at the under side thereof, so that movement of said lever in at least one direction serves to rotate said shaft to retract the bolt.

The operation is as follows: In coupling, the draw bars are brought into immediate and positive register by the tapered link of one, engaged in the corresponding recess therefor in the other. A sufficient clearance is provided in alinement with the locking bolt in each drawhead to permit the link of each coupler entering the complemental recess therefor in the other. The links press the bolts inwardly and strike the inclined walls 13, in each drawhead, which directs the end of each link inwardly into close relation with the heel of the other, as shown in Fig. 7. This position releases the bolts in each drawhead and the springs thereupon impel said bolts positively forward between the back of each link and the side wall of the drawhead affording a long bearing therebetween. Said bolt in locking position is subjected to nothing but crushing stress, and the springs need to be merely of sufficient strength to impel the bolts forwardly as the links come into coupled relation. As the drawheads couple, as shown in Fig. 7, the valve stems in the train line pipes of one drawhead, come into contact with the valve stems in the complemental coupler and these stems are forced inwardly, opening the valves in the train lines. Should it occur that a drawhead have a greater or a less number of lines connected therewith, no inconvenience can occur, inasmuch as the valves in the train lines not coupled, remain closed. When it is desired to uncouple the drawheads, the actuating lever is swung in either direction, thus first retracting the bolt, and second, locking such bolt in its retracted position by the engagement of the end of the lever 18, against the shoulder 24, provided therefor. When the actuating lever for the other drawhead is swung to release position, the bolts of both drawheads having been retracted, the drawheads readily separate.

It is, of course, obvious that we have produced a fundamentally novel device for the class specified, and, while we have shown the same adapted for interurban and steam road traffic, it is, of course, to be understood that, generally speaking, these adaptations are merely illustrative.

We do not purpose limiting the patent to be granted on this application to the specific embodiments and forms of construction hereinbefore set forth illustrated and described as the preferred form of our invention, and it is to be understood that we purpose claiming broadly any construction embodying this invention in which the train line pipes may be coupled simultaneously and automatically with the coupling of the drawheads.

We claim as our invention:

1. In a device of the class described a drawhead, a pointed link rigidly secured in and projecting therefrom and having a straight back, inclined faces on the inner side of said link adapted to interlock with the complemental faces on a link coupled therewith, a bolt having an inclined face and slidable longitudinally in the drawhead acting to engage between the outer straight side of said complemental link and the wall of the drawhead, and rigidly engaging both in coupled relation, said inclined face adapted to correspond to the inclination of the drawhead both in locking and in retracted position, and a lever for retracting said bolt in uncoupling.

2. A drawhead having an inner angled surface, a pointed straight backed link rigidly secured in and projecting therefrom, inclined faces on the inner side of said link adapted to interfit and interlock with complemental faces on a link coupled therewith, a longitudinally slidable bolt seated in a complemental socket in the drawhead and extending longitudinally thereof, the head of said bolt angled to fit flush with the inner angled surface of the draw-head both in extended and retracted position, and a spring seated in said socket and bolt and acting to impel the bolt to engage between the outer side of such complemental link and the wall of the drawhead and acting to rigidly engage the links in coupled relation.

3. A drawhead, a pointed link removably but rigidly secured in and projecting therefrom, a plurality of oppositely inclined faces on the inner side of said link adapted to interlock with complemental faces on a link coupled therewith to afford a plurality of mutually engaging pulling shoulders and a plurality of mutually engaging buffing shoulders, a bolt slidable longitudinally in the drawhead adapted to be retained in unlocked position and when in locking position acting to engage the outer side of such complemental link and rigidly engaging both in coupled relation, and a cam lever adapted to be actuated by said links to release said bolts from unlocked position.

4. In a device of the class described a drawhead, a straight back link rigidly but removably engaging therein, oppositely inclined faces on the inner side of said link, adapted to interfit complemental faces on a corresponding link of a drawhead to couple therewith, and affording two pulling faces and a plurality of buffing faces, an inclined wall in each drawhead acting to force said links into positive engagement in coupling, a spring pressed longitudinally slidable bolt in each drawhead acting to lock the links in engagement, manually operated means for retracting and retaining the bolts for uncoupling, in unlocked position, and a cam on said bolts adapted to be operated by the complemental links for releasing the bolts from such position.

5. A drawhead, a link rigidly but removably engaged therein, oppositely inclined faces on the inner side of said link adapted to interfit complemental faces on the corresponding link of a drawhead to couple therewith, and affording two pulling and a plurality of buffing faces, an inclined wall in each drawhead acting to deflect said links into positive engagement in coupling, said drawhead having a longitudinal socket therein at the side of said wall, a spring pressed bolt in said socket having the head thereof inclined to correspond with said inclined wall when retracted and acting to engage between the side of the drawhead and said corresponding link to lock the links in engagement, and manually operated means for retracting the bolts for uncoupling.

6. In a device of the class described a drawhead, a link rigidly but removably engaged therein, oppositely inclined faces on the inner side of said link adapted to interfit corresponding faces on the corresponding link to couple therewith, an inclined wall in each drawhead acting to force said link into positive engagement, a bolt in each drawhead engaged between the entering link and the side wall of the drawhead and acting to lock the link in engagement, means retracting and retaining the bolts in unlocked position, and mechanism associated with said means and operated by the complemental links to move said means and release the bolts from unlocking position.

7. In a device of the class described a drawhead, a link rigidly held therein and projecting therefrom, a plurality of pulling faces and a plurality of buffing faces oppositely inclined therefrom on its inner side and at its outer end, a bolt adapted to positively hold said link and a complemental link in coupled relation in said drawhead, and automatically releasable means locking said bolt in unlocking retracted position.

8. In a drawhead, a link rigidly held therein and projecting therefrom, inclined faces at its outer end affording a tapered point, a plurality of oppositely inclined faces on the inner side the link adapted to interfit corresponding faces of a similar link and affording a plurality of pulling and a plurality of buffing faces, a bolt adapted to positively and firmly hold said corresponding links in coupled relation in said drawhead, means for locking said bolt in retracted position, and a cam associated with said bolt and adapted to be contacted by said corresponding link to release said bolt into unlocking position.

9. In a drawhead of the class described a removable link projecting therefrom and adapted to rigidly engage and interlock with the link in a complemental drawhead, releasable means held in unlocking position, and actuatable by the complemental link into locking position to lock the links in positive engagement, a tubular train line connection extending obliquely through said drawhead link at a buffing face, and adapted to be brought into positive engagement with a like connection in a like drawhead, by the coupling of the drawhead, a valve therein adapted to be opened automatically when the drawheads are coupled, and means to prevent leakage.

10. In a drawhead of the class described a link projecting therefrom, adapted to rigidly engage and interlock with the corresponding link in a complemental drawhead, and a pin extending through the drawhead and the inner end of the link, a laterally directed integral projection on the link engaging the end of the drawhead, a slidable bolt, releasing means actuatable by said corresponding link to projection of said bolts for rigidly holding said links in positive engagement when coupled, tubular train line connections extending obliquely through said drawhead, and through said link at a buffing face, and brought into positive engagement with a corresponding connection by the coupling of the drawhead.

11. A combination railway coupling and pipe line joint of the class described embracing duplicate drawheads, a removable link rigidly engaged in each, and extending longitudinally therefrom, and inclined to a point at its outer end, inclined pulling faces and oppositely inclined buffing faces on said link acting to mutually interfit and engage with corresponding faces on the complemental link, an inclined wall in each drawhead acting to force said links into positive engagement, a spring pressed bolt longitudinally slidable in each drawhead and acting to rigidly engage said links in coupled engagement, and a pivoted crank for retracting and locking the bolts in retracted position in uncoupling and means coupling the train pipe lines at the buffing faces of said links.

12. A railway coupling of the class described embracing duplicate drawheads, a link rigidly engaged in each, and extending longitudinally thereof, a plurality of oppositely inclined faces on each link adapted to mutually interfit and engage with corresponding faces on the complemental link affording a plurality of pulling and a plurality of buffing faces, an inclined wall in each drawhead acting to force said links into positive engagement, a longitudinally slidable spring pressed bolt seated in a socket in each drawhead acting to rigidly hold said links in coupled engagement, a pivoted crank for retracting and locking said bolts in retracted position and means thereon adapted to be actuated by the link to release the bolts to normal in uncoupling.

13. A railway coupling of the class described embracing duplicate drawheads, a pin in each drawhead, a link rigidly engaged thereby and extending longitudinally thereof and tapered to a point at its outer end, inclined faces on said link adapted to mutually interfit and engage with corresponding faces on the complemental link and affording a plurality of pulling faces and a plurality of buffing faces, a substantially right angled projection in the back of each link engaging a shoulder on the drawhead, an inclined wall in each compartment acting to force said links into positive engagement, a spring pressed bolt in each drawhead acting to rigidly engage said links in coupled engagement, means for retracting and holding the bolts retracted, and means actuated by the link in one drawhead for releasing the bolt to normal in the other from such retracted position.

14. The combination with a drawhead and links affording an oblique buffing face, of a plurality of tubular train line connections passing obliquely through said links normal to the buffing face thereof and yieldably engaged therethrough, a sealing gasket mounted in the buffing face of the links, an enlargement on the buffing face of said links to prevent shearing of the gasket therefrom, said train line connections adapted to be brought into communication with corresponding connections in a similar drawhead in coupling, and a valve in each of said train line connections adapted to be opened automatically in coupling.

15. In a device of the class described complementary drawheads, links secured therein adapted to interlock with one another, bolts longitudinally slidable in said drawheads adapted to retain said links in locking position, and means adapted to retain said bolts in retracted position and adapted to be actuated by said links to release said bolts.

16. In a device of the class described a drawhead, an interlocking link therein, means longitudinally slidable in the drawhead adapted to retain a complemental link inserted therein in locked position, a pivoted member adapted to lock said means in unlocking position, and a cam integral with said member projecting through an aperture in the drawhead and adapted to be actuated by said complemental link to release said means from unlocking position to lock said complemental link within the drawhead.

17. In a device of the class described interlocking links, spring actuated longitudinally slidable locking means adapted to retain the same in engagement, and a pivotally mounted bell crank, one arm thereof adapted to retain said means in retracted unlocking position, the other arm thereof adapted to be actuated by one of said links to release said locking means from unlocking retracted position.

18. In a device of the class described interlocking links, a spring actuated slidable bolt adapted to lock the same in interlocking position, and a bell crank, one arm thereof adapted to retract and retain said bolt in unlocking position, manually operated means for actuating said bell crank, the other arm of said bell crank adapted to be contacted by one of said links to release said bolts from retracted position.

19. In a coupler the combination with the interlocking links thereof, of inclined pipe lines extending therethrough and terminating in the abutting faces thereof, said pipe lines arranged in said links along the line of engagement thereof, adapting said pipe lines to engage one another coaxially.

20. In a device of the class described a drawhead adapted to be coupled by an oblique movement, an interlocking link therein, inclined abutting faces on said link, and horizontal pipe lines extending therethrough normal to said inclined abutting faces and inclined within said drawhead and adapted to engage coaxially with other drawhead pipe lines in coupling.

21. In a device of the class described a drawhead, inclined abutting faces thereon, pipe lines extending horizontally through said inclined abutting faces, and means constraining said drawheads to move to couple with a similar drawhead on a line coaxial with the inclined pipe lines.

22. In a device of the class described a drawhead, a link rigidly held therein, a bolt slidable in said drawhead adapted to hold a similar complemental link in locking position when engaged therein, and rotative means retracting and acting to retain said bolt into unlocking position during the interlocking of said complemental link.

In testimony whereof we have hereunto subscribed our names in the presence of two subscribing witnesses.

WILLIAM T. VAN DORN.
HERBERT E. VAN DORN.

Witnesses:
LAWRENCE REIBSTEIN,
GEORGE R. MOORE.